United States Patent Office 3,692,717
Patented Sept. 19, 1972

3,692,717
MODIFIED NON-GELLED ALKYD RESIN COMPOSITION AND PROCESS FOR ITS PREPARATION
Werner Josef Blank and Jerry Norman Koral, Stamford, Conn., assignors to American Cyanamid Company, Stamford, Conn.
No Drawing. Continuation-in-part of application Ser. No. 42,482, June 1, 1970. This application May 13, 1971, Ser. No. 143,234
Int. Cl. C09d 3/66, 9/24
U.S. Cl. 260—21        10 Claims

ABSTRACT OF THE DISCLOSURE

This invention relates to a modified, homogeneous alkyd resin composition comprising a mixture of the esterification reaction product of an oxatetracyclo undecanol, a substantially unsaturated higher fatty acid, followed by α-addition or Diels-Alder reaction with an α,β ethylenically unsaturated dicarboxylic acid and further modified by a mixture of a polymerizable styrene and an α,β ethylenically unsaturated monocarboxylic acid, and to a process for its preparation.

---

This application is a continuation-in-part of our copending application Ser. No. 42,482, filed on June 1, 1970, now abandoned.

BACKGROUND OF THE INVENTION

Alkyd resin compositions have been known for a substantial plurality of years and have been used primarily in the field of coatings. The name "alkyd" is a euphonius rendition of alcid and was coined by Kienle to indicate that alkyd resins are made by the esterifiction of polyhydrix alcohols with polycarboxylic acids. Frequently, the alkyds are modified by including as a reactant the glyceride oils or the fatty acids derived therefrom or the monoglycerides of said fatty acids. Further modifications can convert hydrophobic alkyd resins to hydrophilic alkyd resins and the latter become water dispersible. The alkyd resins, as a family, are used primarily for coating purposes, and these coatings can be applied by brushing, spraying, roller coating, and the like. Electrodeposition of coatings has been known for decades. More recently, the use of electrodeposition in depositing films of coating compositions onto a metal substrate have become of significant commercial importance. The coating compositions of the present invention, although useful as coatings to be applied by brushing, spraying, roller coating, and the like, are particularly useful in the field of electrodeposition as will be pointed out herein below.

FIELD OF THE INVENTION

The present invention is in the field of modified, homogeneous alkyd resin compositions, and more particularly, in the field of coating compositions useful for the electrodeposition of protective films on metallic substrates.

DESCRIPTION OF THE PRIOR ART

An article written by C. G. Sumner entitled "The Anodic Deposition of Oleo-Resinous Lacquers" appeared in the Trans-Faraday Society, 36, 272 (1940). A. E. Gilchrist issued the United States Letters Pat. No. 3,362,899 on Jan. 9, 1968, directed to a method of maintaining bath composition in continuous electrodeposition process. One of the applicants herein, J. N. Koral, issued the United States Letters Pat. No. 3,471,388. Yurcheshen et al. issued the United States Letters Pat. No. 3,502,557 on Mar. 24, 1970, directed to the electrodeposition of amine-aldehyde condensate and hydroxy-containing carboxylic acid co-reaction products.

SUMMARY OF THE INVENTION

This invention relates to a modified, non-gelled, homogeneous alkyd resin composition comprising the esterification reaction product of (1) 4-oxytetracyclo [6.2.1.0$^{2,7}$.0$^{3,5}$] undecan-8 (9)-ol, (2) a substantially unsaturated aliphatic monocarboxylic acid having from 12 to 22 carbon atoms, said ester being modified by (3) an α,β ethylenically unsaturated dicarboxylic acid to affect α-addition of Diels-Alder condensation, said modified ester being further modified by a mixture of (4) a polymerizable styrene and (5) an α,β ethylenically unsaturated monocarboxylic acid, wherein the modified esterification reaction product (1), (2), and (3) is present in an amount varying between about 30% and 93%, by weight, and said mixture of (4) and (5) is present correspondingly between about 70% and 7%, by weight.

The modified, homogeneous alkyd resin composition of the present invention is, in general, dispersed in deionized water and combined with an amino cross-linking agent. Resultant dispersion is neutralized at least in part with an amino compound other than an amino cross-linking agent.

The first component used to prepare the polyesterification reaction product is a commercially available compound sold under the name "Polycyclol 1222" by the Union Carbide Company. It is chemically identified as 4-oxatetracyclo [6.2.1.0$^{2,7}$.0$^{3,5}$] undecan-8 (9)-ol. This compound has the following structural formula:

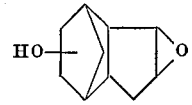

It will be referred to sometimes hereinbelow as otunol for the sake of simplicity and brevity.

The second component in the polyesterification reaction product is a substantially unsaturated, aliphatic monocarboxylic acid containing between about 12 and about 22 carbon atoms, such as dodecylenic, tridecylenic, oleic, linoleic, linolenic, elaeostearic, ricinoleic, erucic acids, and the like. These acids may be utilized either singly or in combination with one another, and more frequently, the combination is used such as when one uses the fatty acids derived from tall oil or other fatty acids derived from soya oil and the like. If one wishes, one may replace up to 50%, by weight, of the higher aliphatic monocarboxylic acid with commercially available dimer acids or trimer acids derived similarly from tall oil or soya oil fatty acids. Obviously, these dimers may be used either singly or in combination with one another or in combination with the monocarboxylic acids.

In general, the polyesterification reaction product is formed at temperatures ranging from 200° C. to about 240° C. for from about three to about twenty-four hours. The process can be carried out conveniently without benefit of any solvent material. However, if desired, one could make use of a mutually inert organic solvent of which many are available commercially, such as toluene or xylene. By mutually inert organic solvent, it is understood that the solvent is inert to any of the reactants in the system under the conditions of the reaction.

The amount of total monocarboxylic acid employed in the esterification reaction is critical in the formation of the composition of the present invention. It has been found that from 2.2 mols to 2.8 mols per mol of monocarboxylic acid per mol of otunol should be used to effect complete esterification of the otunol. If less than 2.2 mols are employed, gelation of the composition will occur during subsequent styrene addition. If more than 2.8 mols of monocarboxylic acid are used, the composition will contain unreacted acid which will adversely affect, for instance, the utilization of the claimed composition in terms of coating bath stability, high power requirements to effect electrodeposition, increased gassing at the electrodes, etc.

The third component utilized in the preparation of the composition of the present invention is an $\alpha,\beta$ ethylenically unsaturated dicarboxylic acid. Illustrative of this class of materials are maleic acid and/or anhydride, fumaric acid, aconitic acid, and itaconic acid. The $\alpha,\beta$ ethylenically unsaturated dicarboxylic acids may be used either singly or in combinaton with one another.

The polyester formed is reacted with from 0.5 mol to 2.0 mols of any of the aforementioned dicarboxylic acids at a temperature ranging from about 150° C. to 240° C. for from one-half hour to eight hours to effect modification of the polyester. This modification involves either an $\alpha$-addition or a Diels-Alder reaction. Regardless of the type of modification which will, of course, depend on the unsaturated monocarboxylic acid employed, the amount of unsaturated monocarboxylic acid used is at least equal on a molar basis to the amount of unsaturated dicarboxylic acid reacted. As in the preparation of the alkyd, the process for obtaining the modified alkyd can be carried out conveniently without benefit of any solvent material. However, if desired, one could make use of a mutually inert organic solvent, such as toluene or xylene.

When the alkyd resin component has been prepared, it is then desirable to add an inert organic solvent to the system preparatory to the final modification which entails the addition of at least a polymerizable styrene monomer thereto. After the inert organic solvent has been added to the alkyd resin in its reaction vessel, a hereinbelow defined mixture of a polymerizable styrene and an $\alpha,\beta$ ethylenically unsaturated monocarboxylic acid, together with a suitable polymerization catalyst, is advantageously added to the alkyd resin composition. A vinyl polymer forms in situ.

Among the polymerizable styrenes that may be used in preparing the composition of the present invention are styrene, a methyl styrene, an $\alpha$-chloro styrene, and the like. Additionally, one may use the alkyl ring-substituted and the halo ring-substituted styrenes, such as the o-methyl styrene, the m-methyl styrene, the p-methyl styrene, 2,4-dimethyl styrene, 2,4,5-trimethyl styrene, p-ethyl styrene, o-bromostyrene, 2,4-bromo-5-ethyl styrene, p-isopropyl styrene, p-chloro styrene, 2,4-dichloro styrene, and the like.

Exemplary of the $\alpha,\beta$ ethylenically unsaturated monocarboxylic acids which may be used along with the polymerizable styrenes as a blend in modifying the composition of the present invention are: acrylic acid, methacrylic acid, $\alpha$-chloro acrylic acid, 2-chloro methacrylic acid, crotonic acid, cinnamic acid, and dimethyl acrylic acid.

In general, blends comprising 95–50% of the styrene and 5–50%, of the $\alpha,\beta$ ethylenically unsaturated monocarboxylic acid are used, usually at a temperature ranging from about 110° C. to about 180° C. As stated above, there is formed in situ the vinyl polymer, or more specifically, a copolymer of the styrene and the acrylic acid. The amount of the aforementioned blend used should be sufficient to attain good hardness of the overall resultant alkyl resin without detracting from other desirable properties, such as flexibility of the resin coating and throwing power of the resin composition. It is found that, within the recited range, the addition of the styrene will be sufficient to consume all the unreacted maleic acid anhydride, which if not removed, will adversely affect the coated product resulting from the use of the finished resin in an electrocoating process.

The vinyl polymer used in the composition of the present invention is essentially a copolymeric material containing, on the one hand, the vinyl monomer with no functionality other than the double bond, namely, the styrene type of monomer which may be present in an amount varying between 95% and 50%, by weight, based on the total weight of the copolymer. The second vinyl monomer has, in addition to the functionality of the double bond, a carboxyl group and may be present correspondingly in an amount varying between about 5% and about 50%, by weight, based on the total weight of the copolymer. If desired, one may make use of a terpolymer in which a third polymerizable vinyl monomer is used, namely, one containing, in addition to the functional group of the double bond, a hydroxy group. This type of vinyl monomer may be present in an amount varying between about 0% and 45%, by weight, same basis. Illustrative of this type of monomer are the hydroxyethylacrylate, the hydroxypropylacrylate, the hydroxyethylmethacrylate, the hydroxypropylmethacrylate, the monohydroxyethylmaleate, the bishydroxyethylmaleate, the monohydroxypropylmaleate, the bishydroxypropylmaleate, allyl alcohol, methallyl alcohol, acrylonitrile, and methylmethacrylate.

It is deemed unnecessary to recite at any length and in detail the various other materials that may be used in the preparation of the compositions of the present invention, such as the inert organic solvents; the catalysts, such as the peroxide catalysts; and the chain terminators, such as n-dodecylmercaptan. Suffice to say, the latter are well known and within the skill of the art.

The amount of the alkyd resin present in the mixture of the alkyd resin and the vinyl polymer composition may be varied between about 30% and 93%, by weight, based on the total weight of the two components. Correspondingly, the copolymer of the styrene material and the polymerizable acids may be varied between about 70% and 7.0%, by weight, based on the total weight of the two components.

The cross-linking agents are referred to as amino cross-linking agents, and more precisely, they are amino aldehyde condensates of which a substantial plurality are available commercially, such as the hexakismethoxymethylmelamine which is prepared according to the process shown in the United States Letters Patent No. 2,998,411, which patent is incorporated herein by reference. Modifications of the hexakismethoxymethylmelamine are shown in the United States Letters Patent No. 3,471,388, wherein a mixture of substantially water insoluble, substantially fully etherified hexamethylolmelamines which have no more than four methoxy methyl groups on the average and at least two alkoxy methyl groups selected from the group consisting of ethoxy methyl, propoxy methyl, and butoxy methyl on the average. These mixed, fully etherified hexamethylolmelamine compounds are disclosed in said patent which is incorporated herein by reference. Additionally, the fully etherified tetramethylolbenzoguanamine compounds may be used, such as those disclosed in the United States Letters Patent No. 3,091,612 and the earlier United States Letters Patent Nos. 2,197,357 and 2,454,495, all of which patents are incorporated herein by reference.

When the amino-aldehyde condensate is added to the composition preparatory to use, it is added in an amount varying between about 5% and about 40%, by weight, and preferably, between 15% and 25%, by weight, based on the total weight of the three components; namely, the alkyd resin, the vinyl copolymer, and the amino-aldehyde condensate. The alkyd resin component and the vinyl copolymer are in homogeneous physical admixture with one another at the time the amino-aldehyde cross-linking agent is added. When the total composition is utilized to deposit a film on a substrate such as in an electrodeposition process, the coated metal is passed through a baking oven during which time the solvent dispersion medium is flashed off by volatilization and the cross-linking agent causes the alkyd resin component to react with and become chemically combined with the vinyl copolymer.

In order that the concept of the present invention may be more fully understood, the following examples are set forth in which all parts are parts by weight unless otherwise indicated. These examples are set forth primarily for illustration purposes, and any specific enumeration of detail contained therein should not be interpreted as a limitation on the case except as is indicated in the appended claims.

EXAMPLE 1

Into a suitable reaction vessel equipped with a thermometer, stirrer, inert gas, inlet and outlet tubes, there are introduced 150 parts of tall oil fatty acids and the acid number of the charge is taken. There is then added 36.5 parts of otunol. The materials are mixed together and the acid number of the blend is determined. The acid number of the blend should be about 80.5 plus or minus 0.5% of the original acid number determined. The charge is then heated under an inert blanket of nitrogen gas to a temperature of 230–235° C. using an open stack. The charge is held for five hours at that temperature. After the five-hour period, the acid number is determined hourly. When the acid number drops to below about ten, the mass is cooled to about 200° C. and a viscosity reading is taken on a sample on the Gardner-Holdt scale at 25° C.

The inert gas flow is reduced and it is switched to an inert blanket. There is then added 22 parts of maleic anhydride while the reaction mass is held at around 200–210° C. The mass is heated with constant stirring over a period of time from 15 to 30 minutes at a temperature from 230° C. to 235° C. When the charge reaches 230° C. to 235° C., it is held at that temperature for about 90 minutes.

The resultant mass is cooled to about 145° C. to 150° C. and viscosity determinations are taken on samples again under the Gardner-Holdt scale at 25° C. A reflux condenser is then attached to the reaction system followed by the addition of 22 parts of diacetone alcohol, an inert organic solvent, and the mass is then refluxed at about 145 to 150° C. The batch is maintained at 145° C. to 150° C. There is prepared separately a blend of 77 parts of monomeric styrene, 8.8 parts of acrylic acid, 1.75 parts ditertiarybutyl-peroxide, and 0.44 part of n-dodecylmercaptan. The blend of the latter components is then fed into the reaction system over a period of about 100 to 120 minutes. Reflux is maintained throughout the whole reaction. The temperature drops slightly during the addition of the blend to about 135° C. to 140° C. After the addition is finished, the batch is then held at about 135° C. to 140° C. for about two hours. After the holding period, the batch is cooled to about 110° C. and there are added 75 parts of secondary butanol, an inert organic solvent. The final product had a Brookfield viscosity at 25° C. of 50 to 150 poises; and on the Gardner-Holdt scale at 25° C., the viscosity was $Z_3$–$Z_6$; color on the Gardner scale is <8 and had an Acid Number of 80.

EXAMPLE 2

This example illustrates the preparation of an electrocoating bath.

Into a suitable reaction vessel used for mixing purposes, there are introduced 91 parts of the resin composition prepared according to Example 1. Additionally, there are added the following components: 12 parts of a melamine aldehyde cross-linking agent, 2.8 parts of diethylamine, 20 parts of rutile titanium dioxide, and 874.2 parts deionized water. The cross-linking agent, namely, the tetra ethyl dimethyl ethers of hexamethylolmelamine and the diethylamine, are added to the resin first, followed by the addition of the titanium dioxide which is then ground into a paste on a three roll mill. Under high-speed agitation, the deionized water is added in small portions to the paste. When phase inversion takes place, the rest of the deionized water can be added in one portion. This bath has been agitated for 24 hours prior to use. The 10% solids paint is poured into a steel container acting as a cathode. The metal piece to be coated is connected to the anode of an electric power supply. A potential of 300 volts is used for one minute.

The film deposited on the metal piece is rinsed with deionized water and baked for 20 minutes at 175° C. The coating has a film thickness of about 0.6 mil. The Knoop hardness is 18.5, pencil hardness 2H–3H. The impact resistance is >50 in. lbs.

EXAMPLE 3

Example 1 is repeated in all essential details except that the following components were used:

| | Parts |
|---|---|
| Tall oil fatty acid | 340 |
| Otunol | 84 |
| Maleic anhydride | 50 |
| Mesityloxide | 50 |
| Styrene | 150 |
| Acrylic acid | 12.5 |
| Acrylonitrile | 25 |
| t-Butylperoxyacetate | 4 |
| t-Dodecylmercaptan | 1 |

The polymerization of the vinyl polymer is carried out at about 110° C. to 120° C., and the polymer blend is diluted with 2-ethoxyethanol to 75% solids.

The above procedure is repeated in every respect, except that 294 parts of tall oil fatty acids are substituted for 340 parts of tall oil fatty acids. Upon addition of the styreneacrylic acid blend, the composition gels and must be discarded.

EXAMPLE 4

An electrocoating bath is prepared by the formula used in Example 2; the only difference is that the titanium dioxide rutile is replaced with iron oxide red and the alkyd resin composition is prepared according to Example 3. Panels are deposited of this formulation at a voltage of 300 to 350 volts. Salt spray exposure on zinc-phosphated steel shows very good resistance up to 240 hours. The impact resistance of a film is about 80 in. lbs. The pencil hardness is 2H–3H.

EXAMPLE 5

Example 1 is repeated in all essential manipulative details except that the following ingredients were used in the stated amounts:

| | Parts |
|---|---|
| Linseed oil fatty acid | 700 |
| Otunol | 166 |
| Maleic anhydride | 80 |
| Styrene | 400 |
| Acrylic acid | 30 |
| Ditertiarybutyl peroxide | 8 |
| 2-ethoxyethanol | 336 |

EXAMPLE 6

Eighty-seven parts of the resinous material of Example 5 are blended with 30 parts of tetra (butoxymethyl) benzoguanamine resin. To this blend there are added 3.6 parts of diethylamine. The resulting mixture is emulsified with 870 parts of deionized water. Using the electrodeposition equipment described in Example 2, a potential difference of 250 volts for one minute is employed to effect coating. As the anode material, a cleaned aluminum panel is used. The deposited film is rinsed and baked at 350° F. for 20 minutes. The deposited film has a pencil hardness of 2H–3H. After an exposure to salt fog for 500 hours, no corrosion can be observed.

EXAMPLE 7

Into a suitable reaction vessel equipped with stirrer, inert gas, inlet and outlet tubes and a reflux condenser, there are added 600 parts of tall oil fatty acids, 180 parts of dimeric fatty acids, and 166 parts of otunol. The charge is heated slowly to 220° C. to 235° C. using a nitrogen blanket. The charge is held at about 230° C. for about eight hours, whereupon the acid number is measured. When the acid number reaches the range of 10–20, the charge is cooled to about 200° C. and 50 parts of fumaric acid are added. The latter mixture is reheated to 230° C. and held for three hours at 230° C. The charge is next cooled to about 170° C., whereupon 300 parts of 2-ethoxyethanol are added incrementally. There is prepared separately a blend of 700 parts of styrene, 100 parts of acrylic acid, 50 parts of 2-hydroxypropyl acrylate, 175 parts of 2-ethoxyethanol, and 10 parts of a ditertiarybutyl peroxide. The catalyzed monomer blend solution is fed into the refluxing alkyd solution over a three-hour period. Thereafter, the charge is held at reflux for four hours at about 130° C. to 140° C. The charge is cooled to room temperature and discharged from the reactor. The resulting polymer solution has a solids content of 78–80%, a Gardner-Holdt viscosity at 25° C. of from $Z_3$ to $Z_6$, and the acid number is between about 60–75.

EXAMPLE 8

Eighty parts of the polymer solution of Example 7 are blended with 15 parts of di(butoxymethyl) tetra (methoxymethyl) melamine, a cross-linking agent. To this blend there are added 25 parts of rutile titanium dioxide and 4.7 parts of diethylamine. After dispersing the pigment on a high-speed dissolver, the resulting paste is emulsified in 820 parts of deionized water. Using electrodeposition conditions described in Example 2, a 0.8 mil film is obtained. This film has a Knoop hardness of 25 and an impact resistance of 20 in. lbs. Films deposited on a zinc-phosphate pretreated cold-rolled steel substrate displayed no corrosion attack, even after exposure to salt fog for 240 hours.

We claim:

1. A modified, non-gelled, homogeneous alkyd resin composition comprising: (1) the esterification reaction product of 1 mol of 4-oxatetracyclo [$6.2.1.0^{2,7}.0^{3,5}$] undecan-8 (9)-ol and from 2.2 mols to 2.8 mols of a substantially unsaturated aliphatic monocarboxylic acid containing from about 12 to about 22 carbon atoms, said esterification reaction product being modified by from 0.5 mol to 2.0 mols of an $\alpha,\beta$ ethylenically unsaturated dicarboxylic acid per mol of said esterification product, said modified esterification reaction product being further modified by a mixture of from 95% to 50% of (2) a polymerizable styrene and from 5% to 50% of an $\alpha,\beta$ ethylenically unsaturated monocarboxylic acid, the percentages of said mixture being based on the weight of the overall resultant polymer formed from said mixture, and wherein the modified esterification reaction product is present in an amount varying between about 30% and 93%, by weight, and said mixture of (2) is present correspondingly between about 70% and 7%, by weight.

2. A modified, non-gelled, homogeneous alkyd resin composition according to claim 1 in which the unsaturated aliphatic monocarboxylic acid reactant is tall oil fatty acids.

3. A modified, non-gelled, homogeneous alkyd resin composition according to claim 1 in which the polymerizable styrene is styrene.

4. A modified, non-gelled, homogeneous alkyd resin composition according to claim 1 in which the reactant, $\alpha,\beta$ ethylenically unsaturated dicarboxylic acid, is maleic anhydride.

5. A modified, non-gelled, homogeneous alkyd resin composition according to claim 1 in which the unsaturated aliphatic monocarboxylic acid reactant is a mixture containing 50% tall oil acids and 50% dimerized tall oil acids.

6. A modified, non-gelled, homogeneous alkyd resin composition according to claim 1 which contains additionally from about 5% to about 40%, by weight, based on the total weight of the total composition of an amino cross-linking agent.

7. A modified, non-gelled, homogeneous alkyd resin composition according to claim 6 in which the amino cross-linking agent is present in an amount varying between about 15% and 25%, by weight, based on the total weight of the total composition.

8. A process for the preparation of a non-gelled, homogeneous, modified alkyd resin composition according to claim 1 which comprises the steps of:
   (1) esterifying 1 mol of 4-oxatetracyclo [$6.2.1.0^{2,7}.0^{3,5}$] undecan-8 (9)-ol with from 2.2 to 2.8 mols of a substantially unsaturated higher aliphatic monocarboxylic acid containing of from about 12 to about 22 carbon atoms at a temperature of from about 200° C. and about 240° C. for from three to twenty-four hours to obtain a polyester.
   (2) reacting 1 mol of said polyester with from 0.5 to 2.0 mols of an $\alpha,\beta$ ethylenically unsaturated dicarboxylic acid at a temperature ranging from about 150° C. to about 240° C., and
   (3) further reacting the so-modified polyester of (2) with a mixture of from 95% to 50% of a polymerizable styrene and from 5% to 50% of an $\alpha,\beta$ ethylenically unsaturated monocarboxylic acid at a temperature from about 110° C. to 180° C., said percentages being based on the weight of the resultant polymer formed.

9. The process according to claim 8, wherein the aliphatic monocarboxylic acid is tall oil fatty acid.

10. The process according to claim 8, wherein the $\alpha,\beta$ ethylenically unsaturated dicarboxylic acid is maleic anhydride.

References Cited

UNITED STATES PATENTS

| | | | |
|---|---|---|---|
| 3,340,213 | 9/1967 | McGary et al. | 260—22 |
| 3,341,485 | 9/1967 | Long | 260—18 |
| 3,362,899 | 1/1968 | Gilchrist | 260—22 |
| 3,437,481 | 4/1969 | Graver et al. | 260—22 |
| 3,451,955 | 6/1969 | Koral et al. | 260—21 |
| 3,471,388 | 10/1969 | Koral | 204—181 |

DONALD E. CZAJA, Primary Examiner

R. W. GRIFFIN, Assistant Examiner

U.S. Cl. X.R.

117—132 R, 161 K, 161 L; 204—181; 260—22 EP, 22 CB, 22 D, 22 M